(12) United States Patent
Singh et al.

(10) Patent No.: US 11,599,763 B1
(45) Date of Patent: Mar. 7, 2023

(54) ON-DEMAND MANUFACTURE OF PAYMENT INSTRUMENTS SECURED BY AN EMBEDDED PROGRAMMABLE MEMORY FILM

(71) Applicant: Bank of America Corporation, Charlotte, NC (US)

(72) Inventors: Shailendra Singh, Thane West (IN); Sandeep Kumar Chauhan, Miyapur (IN); Rama Rao Gaddam, Chanda Nagar (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/876,670

(22) Filed: Jul. 29, 2022

Related U.S. Application Data

(63) Continuation of application No. 17/471,293, filed on Sep. 10, 2021, now Pat. No. 11,481,594.

(51) Int. Cl.
  G06K 19/077 (2006.01)
  G06K 19/07 (2006.01)
  G07F 19/00 (2006.01)

(52) U.S. Cl.
  CPC ... G06K 19/07722 (2013.01); G06K 19/0723 (2013.01); G06K 19/07718 (2013.01); G07F 19/20 (2013.01)

(58) Field of Classification Search
  CPC ......... G06K 19/07722; G06K 19/0723; G06K 19/07718; G07F 19/20

USPC .......................................................... 235/492
See application file for complete search history.

(56) References Cited

U.S. PATENT DOCUMENTS

| | | | |
|---|---|---|---|
| 9,436,335 B1* | 9/2016 | Scherer | G06F 3/023 |
| 2012/0143707 A1* | 6/2012 | Jain | G07F 7/0893 |
| | | | 455/552.1 |
| 2017/0323166 A1* | 11/2017 | Colussi | G06V 40/28 |
| 2021/0081748 A1* | 3/2021 | Finn | G06K 19/07722 |
| 2021/0326817 A1* | 10/2021 | Novis | G06K 7/0013 |
| 2022/0067699 A1* | 3/2022 | Wong | G06Q 20/341 |

OTHER PUBLICATIONS

"ROM, EPROM, AN EEPROM Technology," https://docplayer.net/24449903-Eprom-eeprom-technology.html, Retrieved on Aug. 17, 2021.

(Continued)

*Primary Examiner* — Michael G Lee
*Assistant Examiner* — David Tardif
(74) *Attorney, Agent, or Firm* — Weiss & Arons LLP

(57) ABSTRACT

Apparatus and methods disclosed herein provide technical solution for on-demand manufacturing of a payment instrument that includes an integrated circuit chip. Apparatus and methods provide technical solutions for securely validating and activating the manufactured payment instrument. The customer may submit a request to manufacture a payment instrument through an automated teller machine ("ATM"), online banking channel or mobile banking channel. Apparatus and methods allow a customer to manufacture a payment instrument at home using a 3D printer or use a 3D printer installed at an ATM. Using a secure validation methods, the newly manufactured payment instrument may be activated at an ATM.

14 Claims, 8 Drawing Sheets

(56) References Cited

OTHER PUBLICATIONS

Gupta et al., "Ultra-Thin Chips for High Performance Flexible Electronics," https://www.nature com/articles/s41528-018-0021-5, Mar. 14, 2018.
"Definition of EPROM," https://www.pcmag.com/encyclopedia/term/eprom, Ziff Davis, LLC. PCMag Digital Group, Retrieved on Aug. 17, 2021.
"Definition of EEPROM," https://www.pcmag.com/encyclopedia/term/eeprom, Ziff Davis, LLC. PCMag Digital Group, Retrieved on Aug. 17, 2021.
Rinaldo Di Giorgio, "Smart Cards: A Primer," https://www.javaworld.com/article/2077101/smart-cards--a-primer.html, Dec. 1, 1997.
"EMV," https://en.wikipedia.org/wiki/EMV, Wikimedia Foundation, Inc., Dec. 28, 2019.
"A Guide to EMV Chip Technology," A_Guide_to_EMV_Chip_Technology_v2.0_20141120122132753.pdf (emvco.com), Version. 2.0, Nov. 2014.
Stan Augarten, "A Piece of Electronic Magic: the First Erasable Programmable Read-Only Memory, the 1702," http://smithsonianchips.si.edu/augarten/p32.htm, 1971.
"Computer Hardware," https://web.stanford.edu/class/cs101/hardware-1.html Retrieved on Aug. 17, 2021.
"Introduction to EPROM and EEPROM," https://www.utmel.com/blog/categories/memorychip/introduction-to-eprom-and-eeprom, Utmel Electronic, Aug. 14, 2020.
"Tiny EEPROM Packages: More Choices than the SOIC," https://www.microchip.com/stellent/groups/SiteComm_sg/documents/Training_Tutorials/en532279.pdf, Microchip Technology Inc. 2007.
Bill Giovino, "Use an External Encrypted EEPROM to Secure Data in Embedded Systems," https://www.digikey.com/en/articles/use-external-encrypted-eeprom--secure-data-embedded-systems, Digi-Key Electronics, Jan. 17, 2019.
"Freescale Introduces 90nm Thin Film Storage Flash with FlexMemory for Next-Generation Microcontrollers," https://phys.org/ews/2010-03-freescale-90nm-thin-storage-flexmemory.html, Mar. 3, 2010.

* cited by examiner

ON-DEMAND MANUFACTURE OF PAYMENT INSTRUMENTS SECURED BY AN EMBEDDED PROGRAMMABLE MEMORY FILM

CROSS-REFERENCE TO RELATED APPLICATION

This application is a continuation of U.S. patent application Ser. No. 17/471,293, filed on Sep. 10, 2021, which is hereby incorporated herein by reference in its entirety.

FIELD OF TECHNOLOGY

This application describes apparatus and methods for overcoming technical and security challenges associated with on-demand private production of payment instruments.

BACKGROUND

Currently, customers that misplace their debit, credit or prepaid payment instrument need to place a formal request with the issuing bank to obtain a replacement payment instrument. After the replacement is requested, it takes time for the replacement payment instrument to be manufactured and shipped to the requesting customer.

There is a need to develop a secure self-service mechanism by which a customer can print a replacement card on demand from a convenient location. However, it is technically challenging to add complex security that would ensure that only valid and authorized replacement card are produced by customers on-demand in their private homes and offices, using their own or third-party equipment.

A payment instrument may include a credit card and/or other forms of payment instruments. Such other forms of payment instruments may include: a debit card, an instrument or device that includes a contactless chip, such as an ISO14443-compliant contactless chip, or any other suitable electronic purchasing devices. Payment instruments may store data in a magnetic strip, a bar code, a silicon chip or any other suitable data storage device or format. A point-of-sale terminal may receive data from, provide data to, or exchange data with the payment instrument to conduct a transaction.

A conventional form factor of a purchasing instrument is limited. Purchasing instruments are typically 85.60 millimeters ("mm")×53.98 mm×0.8 mm. This limited form factor allows purchasing instruments to fit easily into a customer's wallet or pocket. However, this form factor also presents design challenges and exacerbates the technical challenge of providing secure on-demand production of a replacement payment instrument.

Incorporating electronic features into a purchasing instrument may provide technology-based solutions that securely protect sensitive data and provide tools for identifying replacement payment instruments manufactured without authorization. However, it is difficult to include electronic features in such a limited size device. For example, to maintain its limited form factor, a purchasing instrument cannot be constructed using a relatively large power supply.

It would be desirable to provide a technical solution that may be deployed to enhance reliability and security of software and hardware for manufacturing replacement payment instruments. It would be desirable to provide technology for securely allowing customer to manufacture a replacement payment instrument at home, at the office, at readily accessible automated teller machines or any other location convenient for the customer. Accordingly, it is desirable to provide ON-DEMAND MANUFACTURE OF PAYMENT INSTRUMENTS BY AN EMBEDDED PROGRAMMABLE MEMORY FILM.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
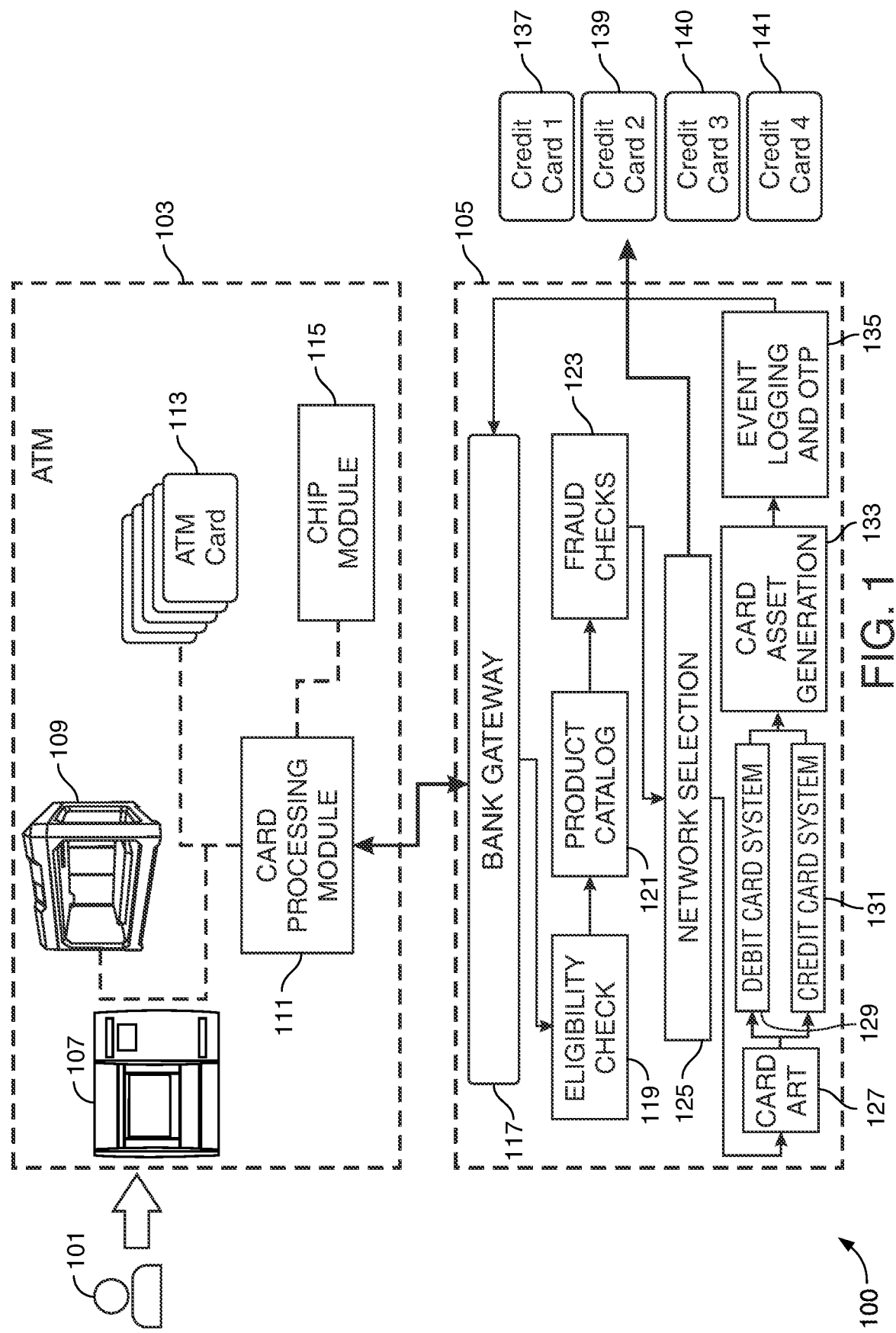
FIG. 1 shows illustrative apparatus and process in accordance with the principles of the disclosure.

Apparatus and methods disclosed herein provide technical solutions for a customer to manufacture a payment instrument ("PI"). The payment instrument may be a credit card, a debit card, an instrument or device that includes a contactless chip, such as an ISO14443-compliant contactless chip or any other suitable purchasing devices. Payment instruments may store data in a magnetic strip, a bar code, a silicon chip or any other suitable data storage device or format. A point-of-sale ("POS") terminal may receive data from, provide data to, or exchange data with the payment instrument.

Apparatus and methods provide technical solutions for securely validating and activating a customer manufactured payment instrument. Apparatus and methods advantageously allow a customer to submit a request for a replacement PI to a bank computer system. "Replacement PI" as used herein may also refer to a customer request for a new PI that has not previously been issued to the customer. The bank computer system will process and provide authentication for a self-service printing task at location desired by the customer.

The customer may submit a request for a replacement PI through an automated teller machine ("ATM"), online banking channel or mobile banking channel. Apparatus and methods allow a customer to print a replacement payment instrument at home using a 3D printer or access a 3D printer installed within an ATM. Using secure validation methods, the newly printed replacement payment instrument may be activated at an ATM.

Apparatus and methods may include printing a replacement PI using a 3D printer or other device for assembling a PI that is installed in an ATM. Apparatus and method may include printing a replacement PI using 3D printer at a customer's home. Apparatus and method may include printing a replacement PI using 3D printer or other device for assembling a PI in any suitable location. The replacement PI may be activated at an ATM, banking center or any other specified location.

A replacement PI may be manufactured with an integrated circuit chip. Apparatus and methods may include inserting the integrated circuit chip into the PI during a manufacturing process. A replacement PI may be manufactured with a memory film. Apparatus and methods may include inserted the memory film into the PI during a manufacturing process. The memory film may be "thin" and have a thickness is less than 0.76 millimeters ("mm"). The memory film may include programmable data points. The programmable data points may be activated to generate and store a grid pattern on the memory film. The grid pattern stored on the thin memory film may later be utilized to securely activate the replacement PI at an ATM or other location.

Apparatus for a programmable payment instrument ("PI") is provided. The PI may have a total thickness that is not greater than 0.76 mm. The PI may have a surface area that is at least 90% of 85.60 mm×53.98 mm. A programmable read only memory ("PROM") film may be embedded within the thickness of the PI. The PROM may be inserted as a layer during a 3D printing process. The embedded PROM film may have a length that is at least 60% of 85.60 mm and a width that is at least 60% of 53.98 mm.

A programmable integrated circuit chip may be embedded in the thickness of the PI. The programmable integrated circuit chip may be an "EMV" chip. EMV is a technology that derives its name from the companies (Europay, MasterCard, and Visa) that helped develop the technology. An EMV chip typically stores a computer program. The computer program is typically stored on the EMV chip by an issuer of the PI at time the PI is manufactured.

The PI issuer may load a specialized program on the EMV chip that is configured to interact with computer systems of target issuer. The specialized program may interact with a POS terminal and instruct the POS terminal to interact with the PI using a protocol defined by the issuer.

Generally, when a PI and its associated EMV chip are inserted into a specialized card reader, the reader powers the EMV chip and the EMV chip generates a new authorization code each time the PI is used to initiate a transaction. The generated authorization code is transmitted to the issuer's computer system. The issuer's computer system then determines whether to allow the requested transaction to proceed. Because the EMV chip is programmed to dynamically generate a new authorization for each transaction, simply copying the sensitive data printed on the face of the PI or encoded on the magnetic stripe may be insufficient to initiate an unauthorized transaction.

An integrated circuit chip inserted into a PI during manufacturing may not include a specialized program. During manufacture of a replacement PI, a grid pattern may be stored on the embedded PROM film. The grid pattern may provide a key for an automated teller machine ("ATM") to program the integrated circuit chip included in the replacement PI with a specialized program that will operate in accordance with a target specification. The grid pattern may provide instructions to an ATM to program the EMV chip on the replacement PI in accordance with specifications of a target issuer or target issuer computer system.

The PI may include a communication circuit. The communication circuit may be capable of wired transmission. The communication circuit may be configured to implement protocols for wireless communication. For example, the communication circuit may provide functionality for conducting near field communication ("NFC"), Wi-Fi, Bluetooth or any other suitable form of wireless communication. Wi-Fi may include passive Wi-Fi with lower power consumption than typical Wi-Fi. The communication circuit may have a thickness that is not greater than 0.76 mm.

The PI may utilize the communication circuit to transfer the grid pattern stored on the PROM to an ATM. In some embodiments, the PI may include a chip for receiving and/or transmitting global positioning system ("GPS") signals. The communication circuit may provide cellular telecommunication capabilities. A location of the PI may be determined using cellular triangulation techniques.

The PI may include a front face and a back face. The PROM embedded in the PI may only be readable (e.g., via NFC) from one of the front face or back faces. For example, an insulating layer may be inserted during a manufacture of the PI. The insulating layer may prevent the PROM from being read from one face of the PI. It may not be apparent from an outside of the PI which face is readable to extract information stored on the PROM.

During the manufacturing process, a message may be relayed to a secure issuer system indicating which face is readable to extract information stored on the PROM. A replacement PI may be inserted into an ATM to program the integrated circuit. The ATM may check whether the PROM is readable from the face indicated during manufacture. Such a process may provide an additional layer of security to prevent validation of unauthorized manufacturer of replacement PIs.

In some embodiments, one or more insulating layers may be inserted during a manufacturing process. The insulating layers may be inserted to prevent sections of the PROM from being readable. The insulating layers may be inserted such that only target sections of the PROM are readable. The insertion of the insulating layers may allow creation of a grid pattern on the PROM. The insulating layers may leave limited sections of the PROM exposed and able to be read. The exposed sections may be activated and form a unique grid pattern.

When replacement PI is manufactured, the integrated circuit may not store a computer program. Later, after the PI is validated, a computer program that configures the PI to operate in accordance with a target specification may be loaded onto the integrated circuit chip. Before the integrated circuit chip is programmed to operate in accordance with the target specification, the integrated circuit chip may be utilized to store validation parameters.

Validation parameters may be generated during manufacturing process of the PI. Illustrative validation parameters may include information such as a time the PROM was embedded in the thickness. Validation parameters may include an internet protocol ("IP") address of a printer that activates a grid pattern on the PROM film. Validation parameters may include an identifier of a target ATM. The target ATM may be an ATM that the customer is directed to use to validate the replacement PI and load the target specification on the integrated circuit chip.

Validation parameters may include an identifier of a mobile device paired to the printer prior to, during or after manufacture of a replacement PI. Validation parameters may include an identifier of a mobile device paired to the printer prior to, during or after a grid pattern is applied to the PROM film. Validation parameters may include a geolocation of the printer that manufactures the replacement PI. The integrated circuit chip may be utilized to store any suitable information that may be used to validate authenticity of a replacement PI manufactured on-demand.

A grid pattern applied to the PROM may be a first grid pattern. After the first grid pattern is read by the ATM, the PROM may be reprogrammed by the ATM to store a second grid pattern. The second grid pattern may provide automated and dynamic second-factor authentication for the PI. After the PI is validated at a first ATM a second grid pattern may be applied to the PROM by the first ATM. The first ATM may upload the second grid pattern to a remote issuer computer system.

An ATM, POS terminal or other device that interacts with the PI may utilize the second grid pattern to automatically verify authenticity of the PI. For example, when the PI is used to initiate a transaction at a second ATM, the second ATM may read the grid pattern currently stored on the PROM. The second ATM may check with the remote issue computer system whether the grid pattern currently stored on the PI matches the second grid pattern. If the grid pattern currently stored on the PI matches the second grid pattern, the transaction may proceed to a next step. If the second grid pattern currently stored on the PI does not match the second grid pattern, the transaction may be aborted.

An automated teller machine ("ATM") that provides self-service, on demand 3D printing of a PI is provided. The ATM may include a 3D printer. The ATM may include stock of memory film. The memory film may be less than 0.76 millimeters ("mm") thick.

The ATM may include a stock of plastic material. The 3D printer may extrude the plastic material to produce the PI. The plastic material may include "card stock." Card stock may refer to material that is spaded in an outline having dimensions of 85.60 mm×53.98 mm. The card stock may have a thickness of 0.76 mm.

The card stock may include one or more cavities. The 3D printer may insert a layer of memory film within a thickness of the PI. The 3D printer may insert the memory film above a previously printed layer of plastic or other material. The 3D printer may insert the layer of memory film into a cavity of the card stock.

An ATM and/or printer may include a write head. The write head may apply a grid pattern to the memory film. The write head may apply the grid pattern by storing electrical charge on the memory film. For example, the memory film may include multiple programmable nodes. The write head may store electrical charge at one or more of the programmable nodes. The grid pattern may be written onto the memory film before the printer deposits a layer of material (e.g., plastic) over the memory film.

In some embodiments, a 3D printer may be configured to deposit additional plastic material above the memory film and contact plates for writing/reading the memory film exposed. The contact plates may provide access to write to the memory film after the memory film is covered by plastic stock. For example, the 3D printer may leave holes around the contact plates. A read/write may include protrusions that fit into the holes to access the contact plates.

In some embodiments, the memory film may be readable and writeable after being entirely covered with a layer of plastic stock. A write head may pass electric charge through the plastic layer deposited above the memory film. A read head may detect electric charge stored on the memory film below the plastic layer deposited above the memory film. For example, the read/write head may access the memory film via NFC communication which can be conducted through the plastic layer above the memory film.

An ATM may include a card dispenser. The card dispenser may release a replacement PI printed by the ATM. The ATM may also include a central processing unit ("CPU") or other processor for controlling overall operation of the ATM and its associated components. The ATM may include RAM, ROM, an input/output ("I/O") module and a non-transitory or non-volatile memory.

The I/O module may include a microphone, button and/or touch screen which may accept user provided input. The I/O module may include one or more of a speaker for providing audio output and a video display for providing textual, audiovisual and/or graphical output. The video display may include a touch sensitive display.

Software may be stored within the non-transitory memory and/or other storage medium. The software may provide instructions to the processor for enabling the ATM to perform various functions. For example, the non-transitory memory may store software used by the ATM, such as an operating system, application programs, and an associated database. Alternatively, some or all of computer executable instructions of the ATM may be embodied in hardware or firmware components.

Application programs, which may be used by the ATM may include computer executable instructions for invoking user functionality related to communication, such as email, short message service ("SMS"), and voice input and speech recognition applications. Application programs may utilize one or more algorithms that validate PIs, load programs onto an integrated circuit chip, store grid patterns on a PROM, process received executable instructions, perform power management routines or other suitable tasks.

The ATM may operate in a networked environment. The ATM may support establishing network connections to one or more remote computers. Such remote computers may be nodes on a network. The nodes may be personal computers or servers that include many or all of the elements described above relative to the ATM. The remote servers may be issuer computer systems. The network connections may include a local area network ("LAN") and a wide area network ("WAN") and may also include other networks. When used in a LAN networking environment, the ATM may be connected to the LAN through a network interface or adapter. The communication circuit may include the network interface or adapter.

When used in a WAN networking environment, the ATM may include a modem or other means for establishing communications over a WAN, such as the Internet. The communication circuit may include the modem. It will be appreciated that the network connections shown are illustrative and other means of establishing a communications link between devices may be used. The existence of any of various well-known protocols such as TCP/IP, Ethernet, FTP, HTTP and the like is presumed, and the ATM can be operated in a client-server configuration to permit a user to retrieve web pages from a web-based server. Web browsers can be used to display and manipulate data on web pages.

The ATM may include various other components, such as a battery, speaker, and antennas. The ATM may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The ATM may utilize computer-executable instructions, such as program modules, being executed by a computer. Generally, program modules include routines, programs, objects, components, data structures, etc. that perform particular tasks or implement particular abstract data types. The ATM may be operational with distributed computing environments where tasks are performed by remote processing devices that are linked through a communications network. In a distributed computing environment, program modules may be located in both local and remote computer storage media including memory storage devices.

The CPU may authenticate a customer request for access to the ATM. After being granted access to the ATM, the customer may submit an on-demand request for a replacement PI. The CPU may issue executable instructions to the 3D printer of the ATM. The 3D printer, in response to receiving the executable instructions from the CPU, may start printing the requested replacement PI.

The PI printed by the 3D printer may include a memory film embedded in a thickness of the PI. The PI may have a thickness of 0.76 mm. The memory film may have a thickness that is less than 0.76 mm. A grid pattern may be stored on the memory film. The grid pattern may be stored on the memory film before the memory film is embedded in the thickness of the PI. The grid pattern may be stored on the memory film after the memory film is embedded in the thickness of the PI.

The ATM may include a communication circuit. In response to receiving a request to print a replacement PI, the CPU may initiate a secure communication link to a mobile device of the customer. The ATM may attempt to authenticate the customer using the secure communication link. For example, the ATM may request a PIN or other confidential information that confirms the customer is authorized to initiate transactions using the requested PI.

The 3D printer may embed an integrated circuit chip in the thickness of the payment instrument. The 3D printer may create a cavity during a manufacture of the replacement PI. Card stock utilized by the 3D printer may include a pre-existing cavity. The 3D printer may position the integrated circuit chip in the cavity. The integrated circuit chip may be an EMV chip. The ATM may be configured to program the EMV chip with a target specification. The target specification may include a specialized program that interacts with a computer systems of an issuer associated with the PI.

When a PI that includes an EMV chip loaded with the specialized program is inserted into an ATM, the EMV chip generates a new authorization code each time the PI is used. An ATM associated with a first issuer may be configured to print a PI that will include an EMV chip loaded with specialized program that interacts with computer systems of a second issuer.

The ATM may include a first write head. The first write head may store a grid pattern on the memory film. The ATM may include a second write head. The second write head may program the integrated circuit chip (e.g., EMV chip) to operate in accordance with a target specification.

The ATM may include a slot. The slot may orient the PI relative to the second write head. ATM may include a read head. The read head may extract the grid pattern stored on the memory film. The slot may orient the PI relative to the read head.

Methods for on-demand printing of a PI are provided. Methods may include linking a mobile device to a 3D printer. Methods may include formulating a request for a replacement PI. The request may be formulated using the mobile deice. Methods may include authenticating the replacement request. In response to authenticating the request, methods may include generating a software payload.

Methods may include encrypting the software payload. Methods may include transmitting the encrypted software payload to the mobile device and/or the 3D printer. Methods may include validating a decryption instruction received from the mobile device. Methods may include decrypting the software payload.

Methods may include extracting a grid pattern from the software payload software. Methods may include storing the grid pattern on the memory film. The grid pattern may be a key that links the replacement PI to a target specification that will be loaded onto the integrated circuit chip. An ATM or other specialized apparatus may be capable of determining which target specification is linked to the grid pattern.

Methods may include using the 3D printer, starting a printing of the payment instrument. Starting the printing may include depositing plastic stock on a substrate. The printing process may include inserting a memory film within a thickness of the payment instrument. The memory film may be less than 0.76 mm thick.

After printing a threshold thickness of the payment instrument, methods may include validating that the mobile device is within a threshold proximity of the 3D printer. In response to successfully validating that the mobile device is within a threshold proximity of the 3D printer, methods may include inserting the memory film within the thickness.

The printing may include creating a cavity for an integrated circuit chip. Methods may include inserting the integrated circuit chip into the cavity. Methods may include inserting the memory film into the thickness of the PI before the integrated circuit is inserted into the cavity. Methods may include inserting the memory film into the thickness of the PI after the integrated circuit is inserted into the cavity.

Methods may include detecting insertion of the PI into an ATM. Methods may include reading a grid pattern stored on the memory film within the PI. Based on the stored grid pattern, methods may include programming an integrated circuit chip on the PI to operate in accordance with a target specification. Before programming the integrated circuit chip, methods may include validating that the mobile device is within a threshold proximity of the ATM.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative process 100. Process 100 shows a method of manufacturing a PI using 3D printer 109 installed in ATM 107. Process 100 includes stage 103 performed at ATM 107. Process 100 includes stage 105 performed at a remote computer system. User 101 may initiate process 100 by submitting a request for a new PI to ATM 107. In response to the request received from user 101, ATM 107 activates card processing module 111.

Card processing module 111 may interact with bank gateway 117. Bank gateway 117 may reside on a remote computer system operated by an issuer. Bank gateway 117 may perform eligibility check 119 to determine whether user 101 meets requirements for the requested PI. Eligibility check 119 may include consulting product catalogue 121 for requirements associated with the requested PI. If user 101 does not meet requirements for the requested PI, eligibility check 119 may provide alternative PI products included in the product catalog 121 that user 101 may be eligible for.

Eligibility check 119 may include fraud checks 123. Fraud checks 123 may perform various computer-generated assessments regarding whether manufacturing the PI requested by user 101 violates any polices designed to reduce unauthorized transactions. Such policies may include limiting a total number of PIs associated with user 101, or verifying a location of user 101.

After successfully completed eligibility check 119, process 100 performs network selection 125. Network selection 125 includes determining an issuer network responsible for authorizing transactions initiated by the requested PI. Network selection 125 may include selecting one of target specifications 137, 139, 140 or 141. After network specification 125 is selected, card art 127 is generated. Card art 127 may include a visual design such as customized pictures, colors or other graphics that will be included on the requested PI.

Next, process 100 determines whether the requested PI will operate on debit card system 129 or credit card system 131. Card asset generation 133 may include creating PI attributes such as a card number, expiration date and CSV code. Card asset generation 133 may include generating a target specification that will be loaded onto the requested PI. The target specification may be loaded onto an EMV chip that will be included in the requested PI.

Process 100 concludes at step 135 by logging all the steps of process 100. Step 135 also includes, upon successful completion of card asset generation 133, generating a one-time-password ("OTP"). The OTP may be transmitted to user 101. User 101 may utilize OTP to authorize printer 109 at ATM 107 to manufacture the requested PI.

After user 101 successfully provides ATM 107 with the OTP generated at step 135, ATM 107 begins 3D printing of the requested PI using printer 109. ATM 107 may instruct printer 109 to pick material from card stock 113. ATM 107 may instruct printer 109 to program an integrated circuit chip using chip module 115. Printer 109 may assemble the requested PI. ATM 107 may dispense the requested PI to user 101.

Figure 2:
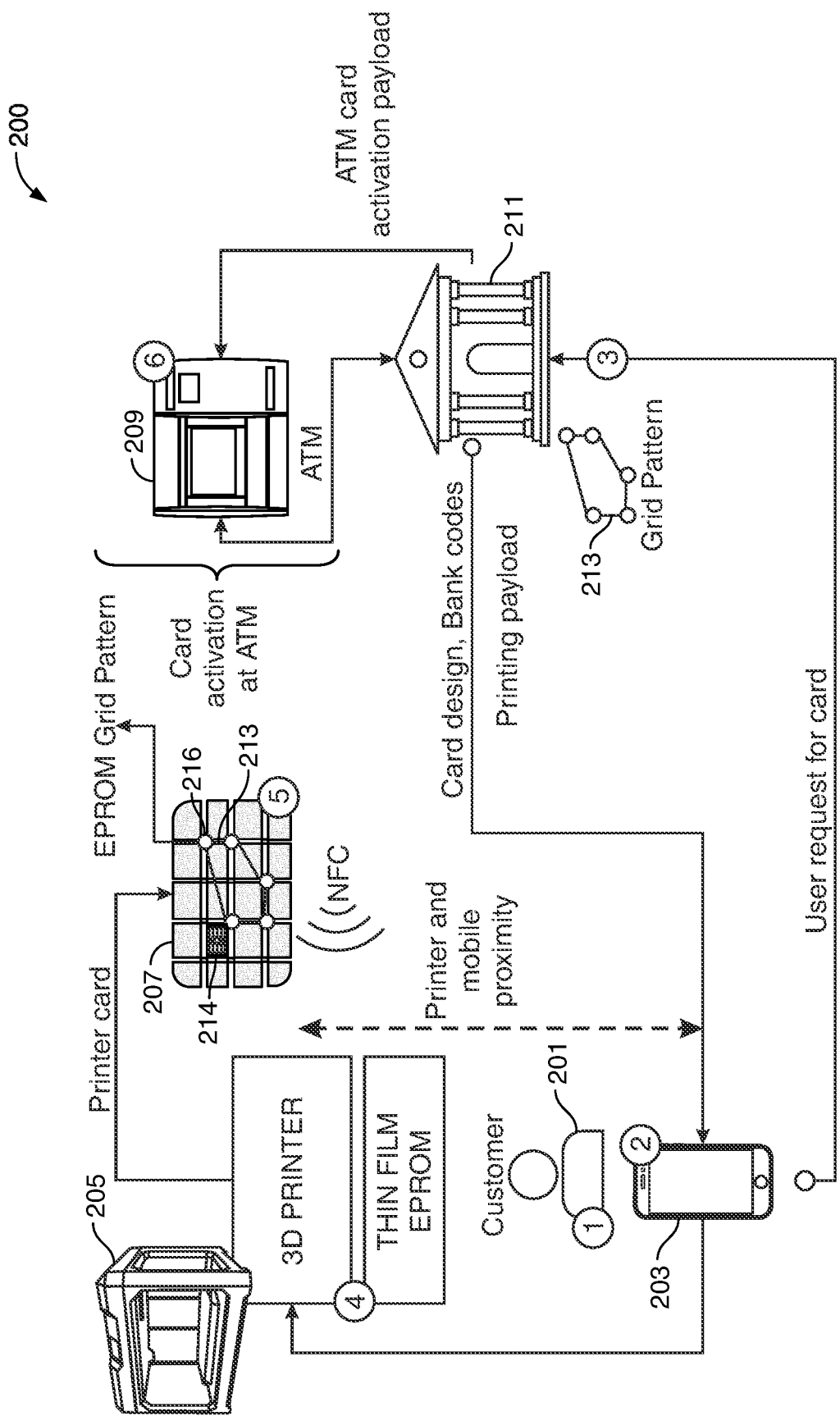
FIG. 2 shows illustrative apparatus and process in accordance with the principles of the disclosure.

FIG. 2 shows illustrative process 200 for manufacturing a PI using a 3D printer at a customer's home. Process 200 includes activating the manufactured PI at an ATM. Process 200 begins when customer 201 uses mobile device 203 to requests authorization from bank 211 to manufacture a new PI using printer 205. Before authorizing the printing of a PI using printer 205, Bank 211 may confirm that mobile device 203 is within a threshold proximity of printer 205. A location of mobile device 203 or printer 205 may be determined based on a GPS sensor, cellular triangulation, IP address or any other suitable method.

Bank 211 may also generate grid pattern 213. Grid pattern 213 may be randomly generated. Grid pattern 213 may be based on a hash of a value associated with customer 201. For example, grid pattern 213 may be generated based on a unique identifier (e.g., account number) associated with customer 201 within database records stored by bank 211.

Bank 211 also generates card assets and card art for the PI. Card assets may include all attributes of the PI. Table 1 below lists illustrative PI attributes.

TABLE 1

Illustrative PI attributes

Illustrative Payment Instrument Attributes

Issuer
Transaction network
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Brand
Affinity In some embodiments, bank 211 may transmit grid pattern 213 and generated PI attributes to a secure application running on mobile device 203. The secure application may be a mobile banking application. The mobile banking application may provide customer 201 with a secure portal for accessing bank 211 via mobile device 203.

After receiving grid pattern 213 and PI attributes, mobile device 203 may instruct printer 205 to commence manufacturing of a PI in accordance with the information received from bank 211. Printer 205 may manufacture a PI that includes memory film 207. Memory film 207 may be embedded in a thickness of a PI. FIG. 2 shows that grid pattern 213 is stored on memory film 207.

Memory film 207 includes programmable data points 216. Programmable data points 216 have been activated to create grid pattern 213 stored on memory film 207. Programmable data points 216 may be activated by storing a value at each of points 216 within memory film 207. Each of points 216 may be a memory cell. For example, a "1" value may be stored at each of points 216. A "0" value may be stored in all other memory cells of memory film 207. Grid pattern 213 is defined by the memory cells (e.g., data points 215) storing a "1" value. In other embodiments, a "0" value may be stored at each of points 216. A "1" value may be stored in all other memory cells of memory film 207. Grid pattern 213 is defined by the memory cells (e.g., data points 215) storing a "0" value.

Grid pattern 213 stored on memory film 207 may be utilized to securely activate the replacement PI at ATM 209 or other location. After printer 205 produces a PI that includes memory film 207, customer 201 may insert the printed PI into ATM 209 for activation and validation. ATM 209 may read grid pattern 213 stored on memory film 207. ATM 209 may communicate with bank 211. ATM 209 may transfer a copy of grid pattern 213 to bank 211 and ask bank 211 to verify that detected grid pattern 213 is the same pattern generated by bank 211 when approving the production of the PI using printer 205.

Bank 211 may confirm that that grid pattern 213 received from ATM 209 is an approved grid pattern. Upon receiving confirmation from bank 211, ATM 209 may load a target specification onto integrated circuit chip 214. The target specification may allow the new manufactured PI to interact with an issuer computer system and conduct transactions on behalf of user 201.

Figure 3:
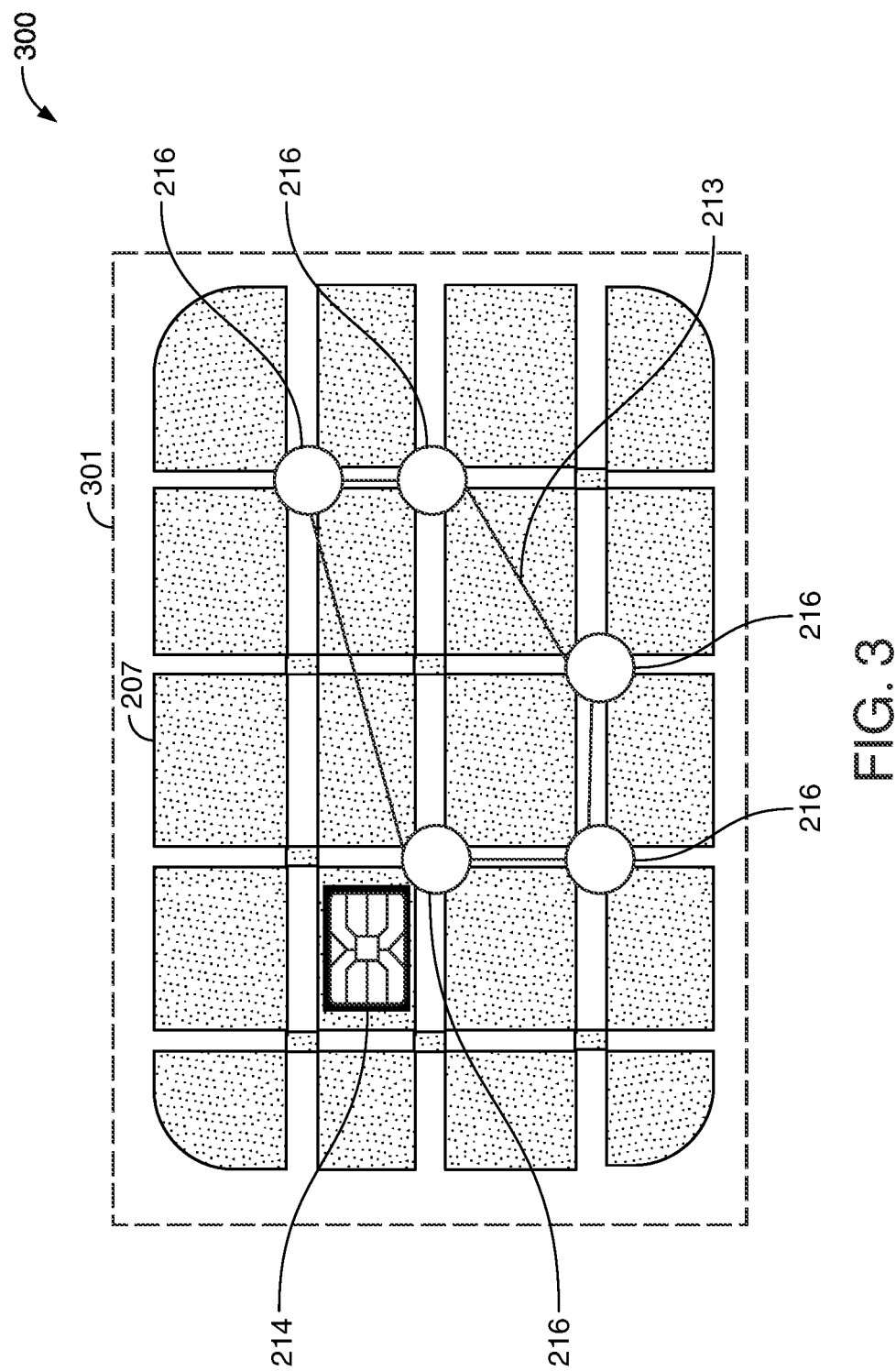
FIG. 3 shows an illustrative apparatus in accordance with the principles of the disclosure.

FIG. 3 shows enlarged view 300 of memory film 207 (shown in FIG. 2). View 300 shows that memory film 207 has been embedded into PI 301. View 300 shows that grid pattern 213 has been stored on memory film 207. Grid pattern 213 may be generated by bank 211. Grid pattern 213 may be defined based on storing a value at points 216 within memory film 207. The values stored at each of points 216 may be different from values stored anywhere else on memory film 207. The values stored at each of points 216 form grid pattern 213.

Figure 4:
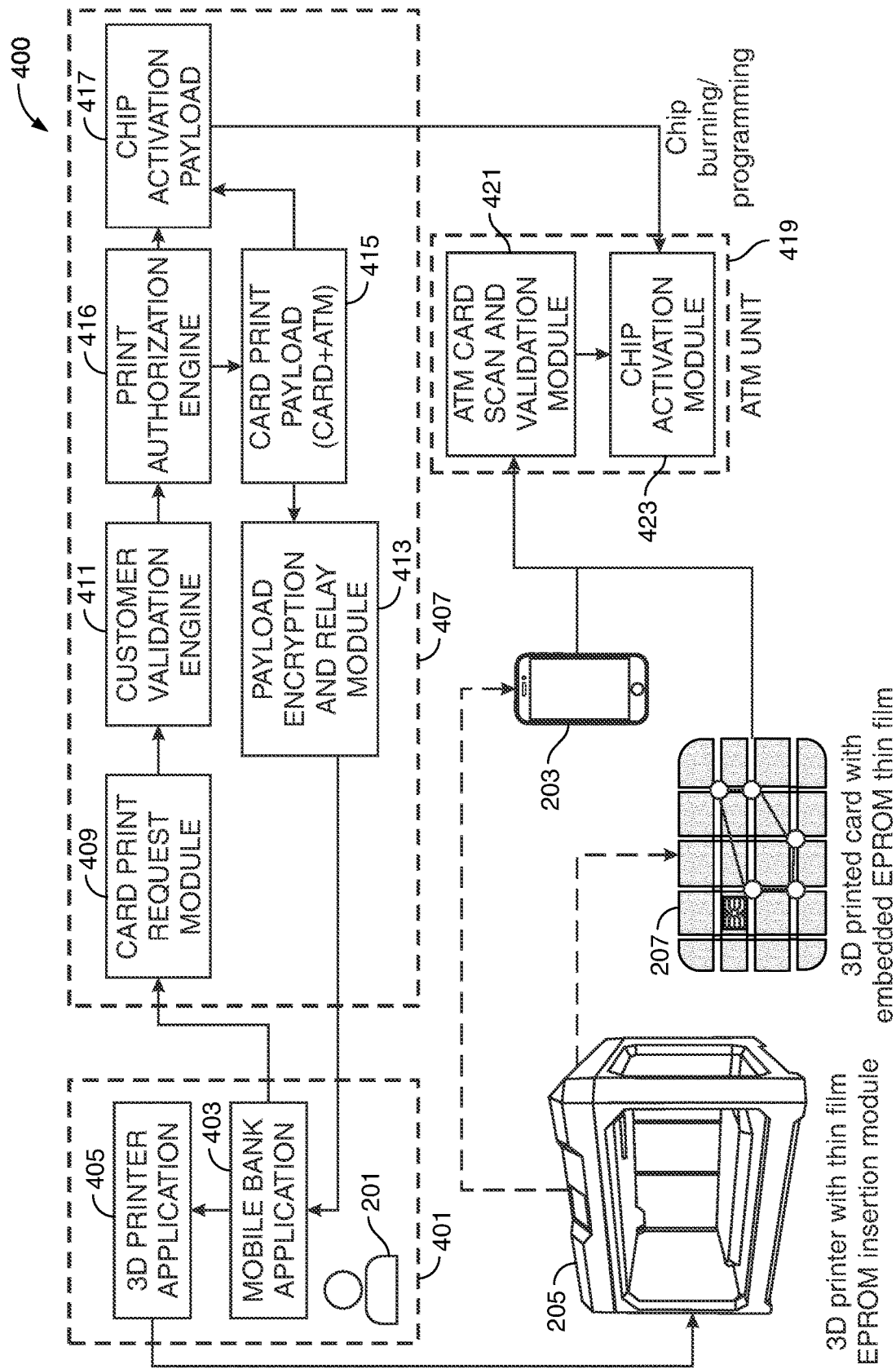
FIG. 4 shows illustrative apparatus and process in accordance with the principles of the disclosure.

FIG. 4 shows illustrative process 400. Process 400 includes stage 401. Stage 401 may be implemented on mobile device 203 of customer 201. Stage 401 includes 3D printer application 405 and mobile bank application 403. Customer 201 may utilize 3D printer application 405 to communicate with, and issue instructions to, 3D printer 205. In some embodiments, 3D printer 205 may reside within ATM 107 (shown in FIG. 1). In some embodiments, 3D printer 205 may reside in a home, office or other desired location of customer 201. Customer 201 may utilize mobile bank application 403 to communicate with bank 211 (shown in FIG. 2).

Process 400 includes stage 407. Stage 407 may be implemented by bank 211 (shown in FIG. 2). Card print request module 409 may receive a request from mobile bank application 403 for a newly manufactured PI. Customer validation engine 411 confirms that customer 201 requesting the newly manufactured PI is eligible for and entitled to use the requested PI. Customer validation engine 411 may include eligibility check 119, product catalogue 121 and fraud checks 123 (all shown in FIG. 1).

After customer validation engine 411 confirms customer 201 is entitled to the requested PI, print authorization engine 416 formulates manufacturing instructions that will be transmitted to 3D printer 205. Print authorization engine 416 may confirm that printer 205 is authorized to print a requested PI. For example, print authorization engine 416 may determine whether mobile device 203 is within a threshold distance of printer 205. A threshold distance may include verifying that mobile device 203 can communicate with printer 205 using NFC. Print authorization engine 416 may require that mobile device 203 remains within a threshold distance of printer 205 until the requested PI is manufactured.

Card print payload 415 may generate PI assets such as a grid pattern that will be applied to a memory film embedded in the newly manufactured PI. Card print payload 415 may generate PI assets such as a target specification that will be loaded onto an integrated circuit of the newly manufactured PI. Other generated PI assets may include any other PI attributes (see, e.g., Table 1). Payload encryption and relay module 413 encrypts the PI assets generated by card print payload 415. Payload encryption and relay module 413 also transmits the encrypted assets to mobile bank application 403 on mobile device 203.

Customer 201 may decrypt the PI assets (e.g., using an OTP, as shown in FIG. 1) and transmit the decrypted PI assets to printer 205. Printer 205 may then manufacture a PI that includes memory film 207 storing a grid pattern determined by card print payload 415. Customer 201 may then insert the newly manufactured PI into ATM 419. ATM 419 includes ATM card scan and validation module 421. Module 421 reads the grid pattern stored on memory film 207. Module 421 communicates with bank 211 and verifies that the grid pattern has been generated by card print payload 415.

Module 421 may verify additional parameters such as PI attributes, IP address of printer 205 and a geolocation of where the PI was printed. These additional parameters may be generated at time the PI is manufactured by printer 205. These additional parameters may be transmitted to bank 211. These additional parameters may be stored on an integrated circuit chip of the newly manufactured PI. ATM 419 may extract the additional parameters stored on the integrated circuit chip and request that bank 211 verify the additional parameters based on values previously transmitted to bank 211 during manufacturing.

After successfully verifying the extracted grid pattern, and any additional parameters, chip validation module 423 writes a target specification to an integrated circuit chip on the newly manufactured PI. The target specification may overwrite any additional parameters stored on the integrated circuit chip. The target specification may be loaded onto an EMV chip. The target specification may allow the newly manufactured PI to interact with a target issuer computer system and conduct transactions on behalf of customer 201.

Figure 5:
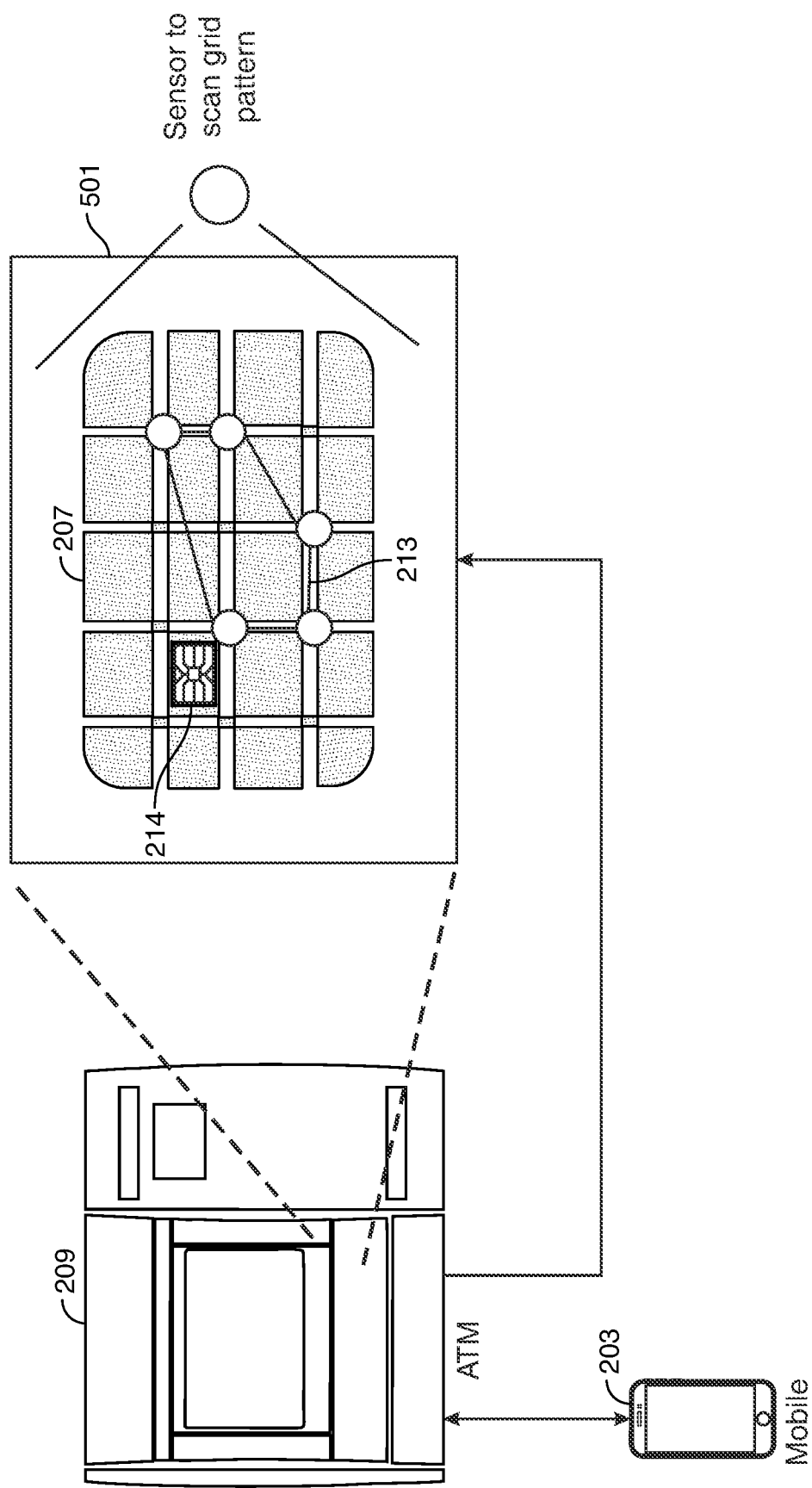
FIG. 5 shows illustrative apparatus and process in accordance with the principles of the disclosure.

FIG. 5 shows illustrative PI 501 that has been manufactured by printer 205. PI 501 may be inserted into a slot (not shown) of ATM 209. The slot may orient PI 501 such that ATM 209 reads grid pattern 213 stored on memory film 207 embedded within PI 501. The slot may also orient PI 501 such that ATM 209 reads any additional parameters stored on integrated circuit chip 214.

The slot may orient PI 501 such that ATM 209 may write a target specification to integrated circuit chip 214. ATM 209 may verify that mobile device 203 is within a threshold proximity to ATM 209 before writing the target specification to integrated circuit chip 214. An identity of mobile device 203 such as a MAC address or IMEI number may be an additional parameter stored on integrated circuit chip 214. ATM 209 may extract a media access control ("MAC") address or international mobile equipment identifier ("IMEI") number associated with mobile device 203. Before writing the target specification to integrated circuit chip 214, ATM 209 may determine whether the MAC address or IMEI number of mobile device 203 corresponds to the values stored on chip 214. Before writing the target specification to integrated circuit chip 214, ATM 209 may determine whether the MAC address or IMEI number of mobile device 203 corresponds to the values available from bank 211 (shown in FIG. 2).

Figure 6:
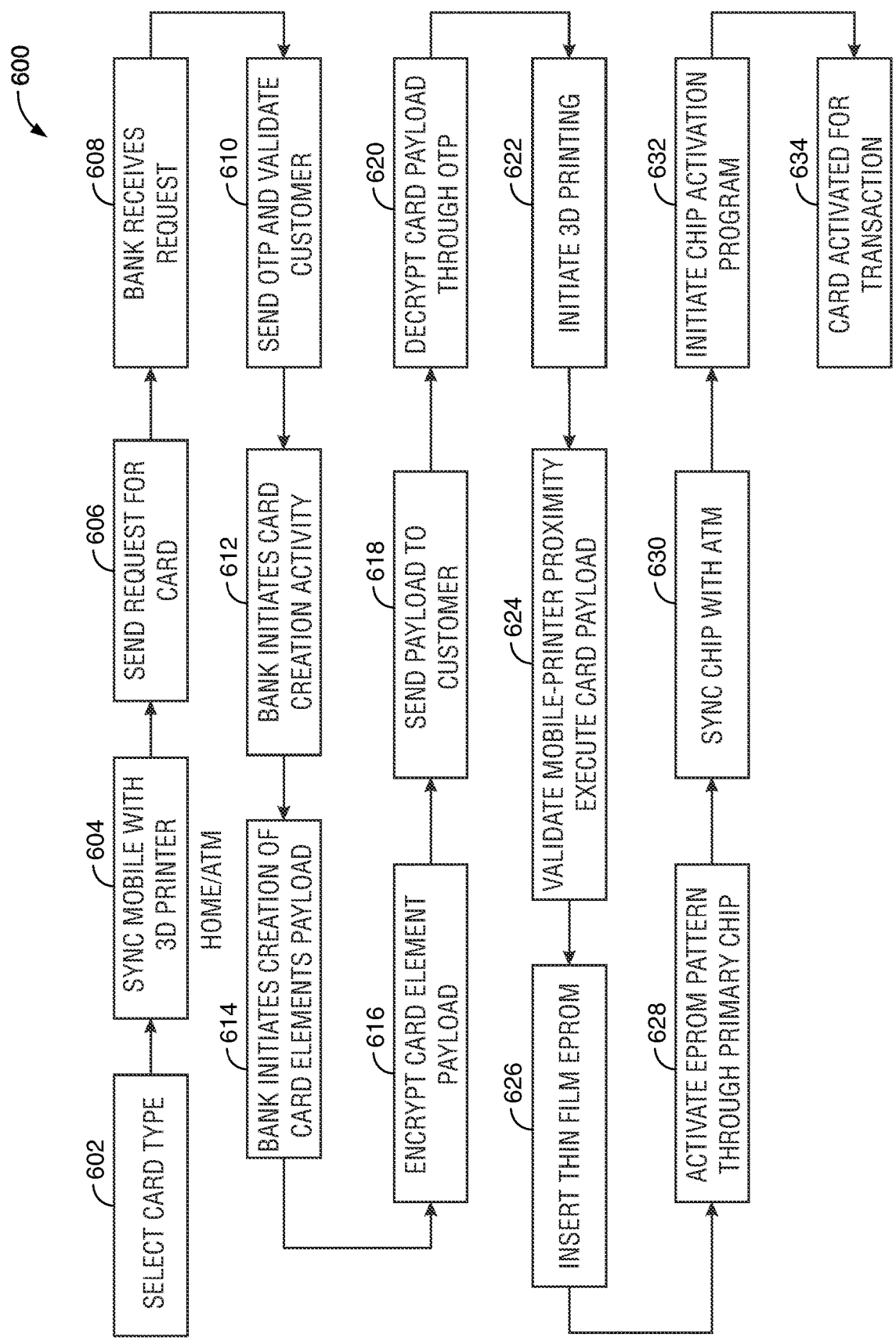
FIG. 6 shows an illustrative process in accordance with the principles of the disclosure.

FIG. 6 shows illustrative process 600. Process 600 begins at step 602. At step 602, using an application running on a mobile device (e.g., 203), a customer (e.g., 201) requests manufacture of a desired PI. At step 604, the customer's mobile device establishes a connection with a 3D printer. The 3D printer may be within a threshold distance of the mobile device. After syncing with the 3D printer, at step 606, a request to have a new PI produced by the printer is generated and transmitted to a bank system (e.g., 211). The mobile application may transmit the customer selection and associated verification parameters to a computer system at a bank.

At step 608, the bank computer system receives the PI manufacturing request. At step 610, the bank validates the requesting customer. Such validation may include verifying that the customer holds an account at the bank. Such validation may include verifying that the customer holds an account associated with the desired PI. At step 610, the bank verifies that the requesting customer qualifies for the desired PI.

At step 610, the bank may also generate an OTP that will be used by the customer to decrypt printing instructions needed to produce the desired PI. At step 612, the bank initiates card manufacturing. Initiating card manufacturing may include generating PI attributes, such as those shown above in Table 1. At step 614, the bank system generates a grid pattern. Step 614 may include generating verification parameters. The generated verification parameters may be stored locally on the newly manufactured PI.

The grid pattern, PI attributes and/or verification parameters may be termed a "payload." At step 616, the payload is encrypted. At step 618, the encrypted payload is transmitted to the requesting customer. The encrypted payload may be transmitted to the requesting customer via a banking application running on a mobile device of the customer. In some embodiments, the encrypted payload may be transmitted to the printer directly from the bank. At step 618, the customer decrypts the received payload. The customer may decrypt the payload using an OTP.

At step 622, the decrypted payload is transmitted to a printer. The mobile device of the customer may be in communication with the printer. The payload may be transmitted to the printer via the mobile device. Upon receipt of the payload, the printer may begin manufacturing the requested PI. During the manufacturing process, at step 624, the printer validates that the customer's mobile device is within a threshold distance of the printer. At step 626, the printer inserts a thin memory film into a thickness of the partially printed PI. At step 628, the printer stores a grid pattern on the thin memory film. The grid pattern may be included in the payload received from the mobile device or directly from the bank. The printer may store the grid pattern on the thin film memory using NFC.

At step 630, the newly manufactured PI is inserted into an ATM. The ATM may attempt to read the grid pattern stored on the thin film memory. The ATM may determine whether the extracted grid pattern matches a grid pattern generated by the bank in connection with the customer request. The ATM may determine whether the extracted grid pattern matches a grid pattern generated by the bank in connection with the customer request submitted by the mobile device. The ATM may determine whether validation attributes stored on the PI match attributes stored by the bank.

When the ATM successfully authenticates the grid pattern and validation attributes, the ATM may activate the PI. Activating the PI may include storing a target specification on an integrated circuit chip of the PI. The target specification may allow the newly manufactured PI to interact with issuer computer systems and conduct transactions.

Figure 7:
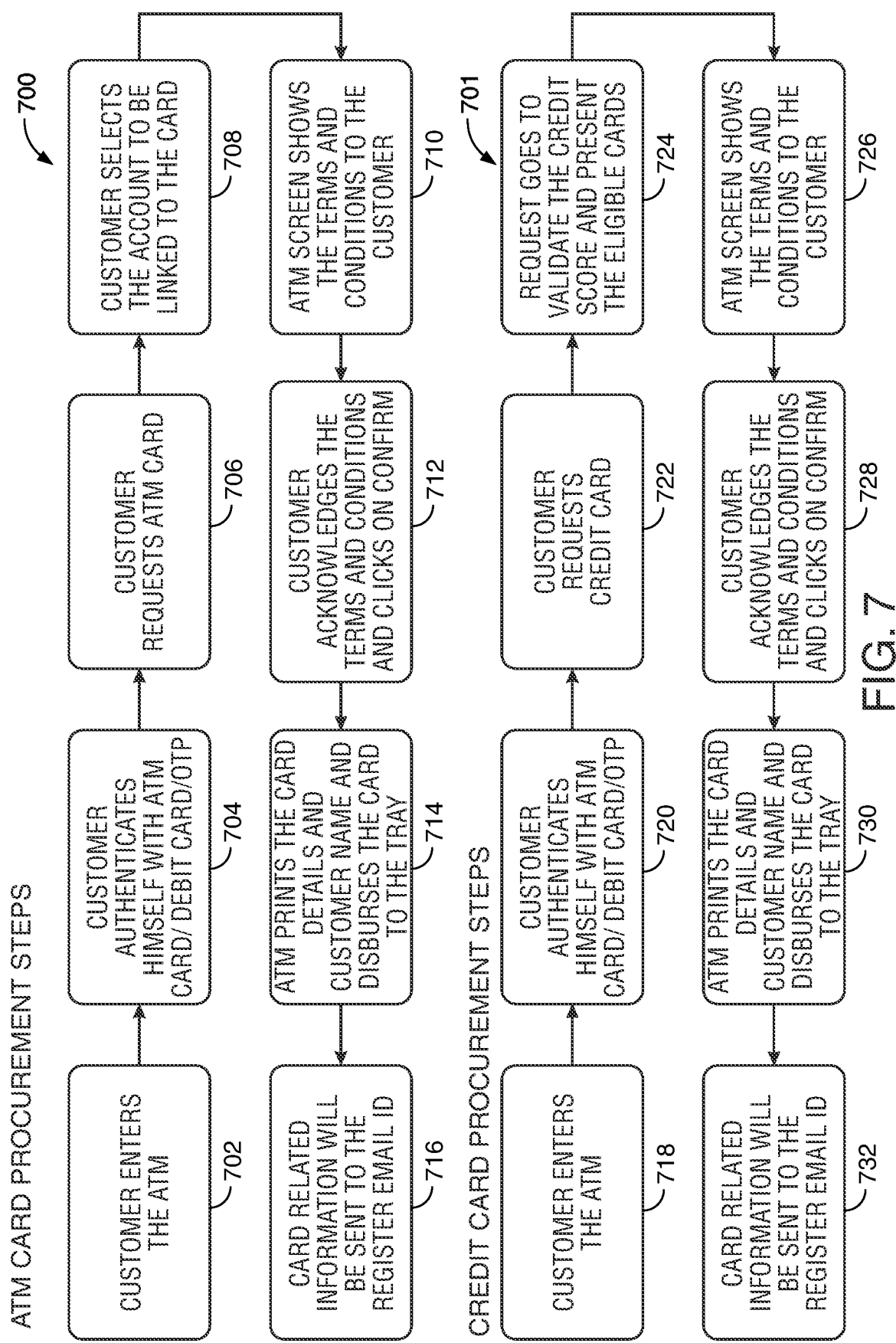
FIG. 7 shows illustrative processes in accordance with the principles of the disclosure.

FIG. 7 shows illustrative process 700 for manufacturing a debit card PI and issuance of the debit card utilizing an ATM. Process 700 begins at step 702. At step 702, a customer approaches the ATM. At step 704, the customer authenticates themselves at the ATM using a card/debit card, other PI, biometric information, OTP or other suitable authentication methods. At step 706, the customer uses the ATM to submit a request for a new debit card PI.

At step 708, the customer selects an account that will be linked to the requested debit card. At step 710, the ATM displays terms and conditions that will be associated with the requested debit card. At step 712, the customer acknowledges the presented terms and conditions. At step 714, the ATM manufactures the requested debit card. The ATM may manufacture the requested debit card using a 3D printer within the ATM. The ATM may dispense the newly manufactured debit card to the customer. The newly manufactured debit card may be ready to execute transaction at a time it is dispensed from the ATM. At step 716, information associated with the newly printed debit card is sent to a registered email address associated with the account linked to the newly printed debit card.

FIG. 7 also shows process 701 for printing a credit card payment instrument and issuance of the credit card utilizing an ATM. Process 701 begins at step 718. At step 718, a customer approaches the ATM. At step 720, the customer authenticates at the ATM using a card/debit card or other payment instrument. The customer may authenticate at the ATM using an OTP. At step 722, the customer uses the ATM to request a new credit card PI.

At step 724, the ATM validates the customer's credit score and otherwise verifies that the customer is eligible for the requested credit card. At step 726, the ATM displays terms and conditions that will be associated with the requested credit card. At step 728, the customer accepts the displayed terms and conditions. At step 730, the ATM manufactures the requested credit card. The manufactured credit card is dispensed to the customer from the ATM. At step 732, PI attributes associated with the newly manufactured credit card are sent to the customer via email.

Figure 8:
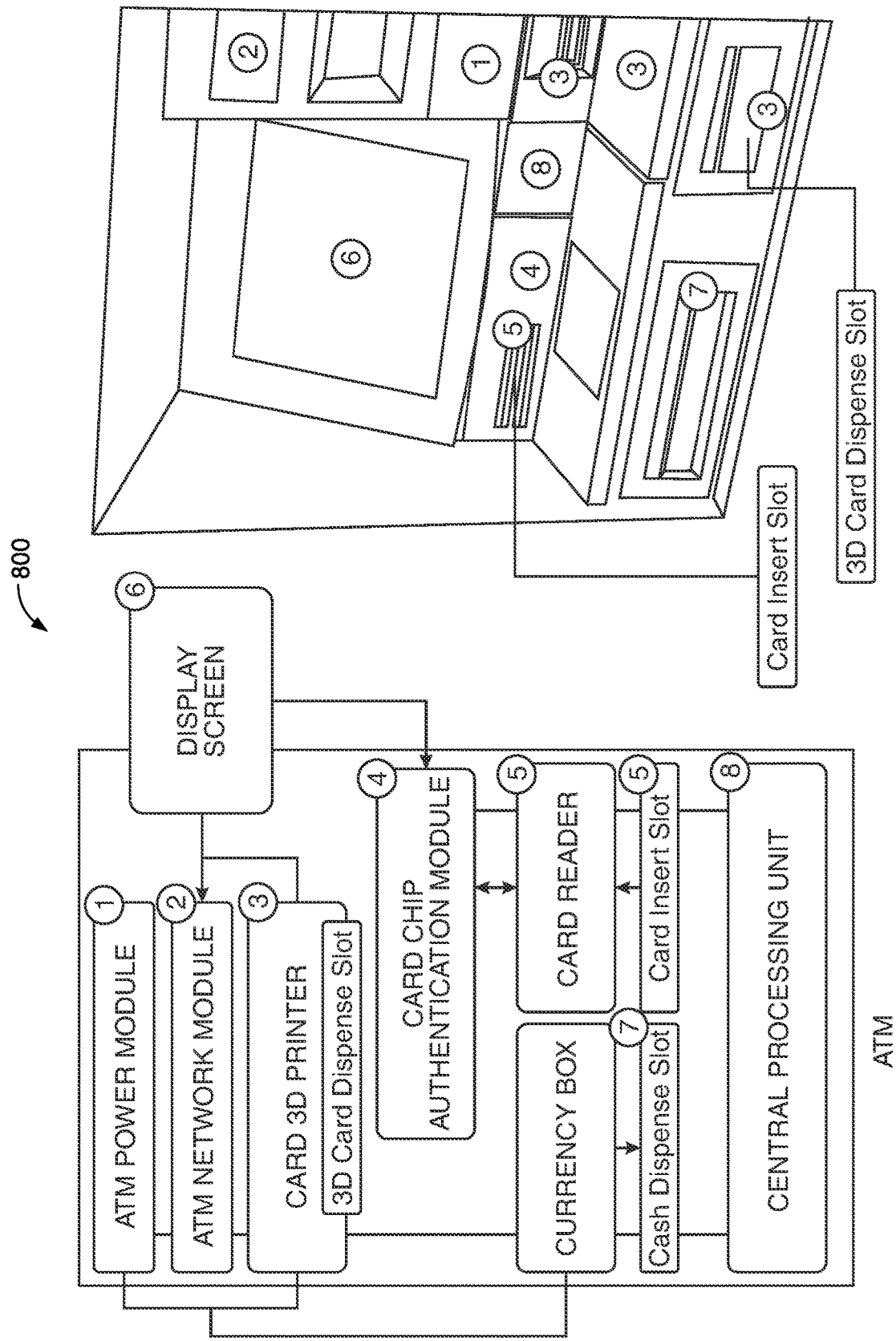
FIG. 8 shows an illustrative apparatus in accordance with the principles of the disclosure.

FIG. 8 shows illustrative ATM 800. ATM 800 includes a power module. The power modules supply power to one or more components of ATM 800. ATM 800 includes a network module. The network module may support network connections linking the ATM to a customer's mobile device. The network module may support network connections linking the ATM to a bank's computer system.

ATM 800 includes a 3D printer. ATM 800 includes a dispense slot for disbursing a PI manufactured by the 3D printer to a requesting customer. ATM 800 includes a card chip authentication module. The card chip authentication module may verify a grid pattern and other validation parameters of a newly manufactured PI. The card chip authentication module may verify a grid pattern and other validation parameters of a PI manufactured by a different ATM or by a customer's private equipment.

ATM 800 includes a currency box for storing cash. A cash dispense slot provides cash to requesting customers. ATM 800 includes a card reader. The card reader may include a slot that orients an inserted PI so that ATM 800 can read the grid pattern, validation parameters or communicate with an integrated circuit chip on a PI. ATM 800 also includes a central processing unit ("CPU") that controls overall operation of ATM 800.

Thus, apparatus and methods for ON-DEMAND MANUFACTURE OF PAYMENT INSTRUMENTS SECURED BY AN EMBEDDED PROGRAMMABLE MEMORY FILM have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A programmable payment instrument comprising:
   a thickness that is not greater than 0.76 millimeters ("mm");

a surface area that is at least 90% of 85.60 mm×53.98 mm;

a programmable memory film ("PMF") embedded within the thickness during a first manufacturing stage performed by a first device and the PMF comprises a plurality of memory cells that define a grid pattern; and a programmable integrated circuit chip embedded in the thickness during the first manufacturing stage performed by the first device;

wherein:

based on the grid pattern, a specialized program is selected and loaded onto the programmable integrated circuit chip during a second manufacturing stage using a second device;

the grid pattern provides a key for the second device to authenticate the programmable payment instrument and load the specialized program onto the programmable integrated circuit chip; and the specialized program configures the programmable payment instrument to be operable with a target specification and a target issuer computer system.

2. The programmable payment instrument of claim 1 further comprising a communication circuit that wirelessly transfers the grid pattern from the PMF to the second device.

3. The programmable payment instrument of claim 2 wherein the communication circuit is capable of near field communication.

4. The programmable payment instrument of claim 1 wherein the PMF has a length that is at least 60% of 85.60 mm and a width that is at least 60% of 53.98 mm.

5. The programmable payment instrument of claim 1 further comprising a front face and a back face;

wherein the PMF is only readable from one of the front face or back face.

6. The programmable payment instrument of claim 1 wherein before the specialized program is loaded onto the integrated circuit chip, the programmable integrated circuit chip stores validation parameters generated at a time the PMF is embedded in the thickness.

7. The programmable payment instrument of claim 6 wherein the validation parameters comprise:

an internet protocol ("IP") address of the first device that applies the grid pattern to the PMF;

an identifier of the second device;

an identifier of a mobile device paired to the first device when the grid pattern is stored on the PMF; or a geolocation of the first device.

8. The programmable payment instrument of claim 1 wherein the grid pattern is a first grid pattern, and after the first grid pattern is read by the second device, the PMF is reprogrammed by the second device to store a second grid pattern that provides second-factor authentication for the programmable payment instrument.

9. The programmable payment instrument of claim 1 wherein the first device is positioned at a first location and the second device is positioned at a second location.

10. The programmable payment instrument of claim 1 wherein the first device is a 3D printer.

11. The programmable payment instrument of claim 1 wherein the second Device is an automated teller machine ("ATM").

12. The programmable payment instrument of claim 1 wherein the first device is located at first location second device at second location.

13. The programmable payment instrument of claim 1 wherein the programmable integrated circuit chip is less than 0.76 millimeters ("mm") thick.

14. The programmable payment instrument of claim 1 wherein the programmable integrated circuit chip is an EMV chip.

* * * * *